(12) United States Patent
Park

(10) Patent No.: US 11,787,316 B2
(45) Date of Patent: Oct. 17, 2023

(54) VEHICULAR SEAT APPARATUS

(71) Applicant: HYUNDAI TRANSYS INC., Seosan-si (KR)

(72) Inventor: Sang Woo Park, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 169 days.

(21) Appl. No.: 17/350,290

(22) Filed: Jun. 17, 2021

(65) Prior Publication Data
US 2022/0017002 A1  Jan. 20, 2022

(30) Foreign Application Priority Data

Jul. 17, 2020 (KR) .......................... 10-2020-0088611

(51) Int. Cl.
*B60N 2/30* (2006.01)
*B60R 21/02* (2006.01)
*B60P 7/14* (2006.01)
*B60N 2/20* (2006.01)

(52) U.S. Cl.
CPC ............ *B60N 2/305* (2013.01); *B60R 21/026* (2013.01); *B60N 2/206* (2013.01); *B60P 7/14* (2013.01)

(58) Field of Classification Search
CPC .. B60N 2/305; B60N 2/0155; B60N 2/01591; B60N 2/3093; B60N 2/3097; B60N 2/3065; B60N 2/3031; B60N 2/12; B60N 2002/0216; B60R 21/026; B60P 7/14
USPC ................ 296/24.43, 65.03, 65.09
See application file for complete search history.

(56) References Cited

U.S. PATENT DOCUMENTS

| 6,036,252 A * | 3/2000 | Hecksel ............. B60N 2/01591 |
| | | 296/65.03 |
| 8,303,014 B2 * | 11/2012 | Orihashi ................. B60P 3/423 |
| | | 296/65.01 |
| 8,322,767 B2 * | 12/2012 | Morita ................... B62D 33/08 |
| | | 296/65.09 |

(Continued)

FOREIGN PATENT DOCUMENTS

| AU | 2009230744 A1 | 11/2009 |
| CN | 1583460 A | 2/2005 |

(Continued)

OTHER PUBLICATIONS

Chinese Office Action dated Mar. 31, 2023; Appln. No. 202110631181.8 (English translation not available).

*Primary Examiner* — Jason S Morrow
*Assistant Examiner* — Wenwei Zhuo

(57) ABSTRACT

The present invention provides a vehicular seat apparatus capable of increasing a baggage-loading space in the indoor space of a vehicle and of preventing the load of baggage from being applied to the seat. The vehicular seat apparatus includes a seat configured to enable a seat back thereof to be folded, a partition wall coupled to the vehicle floor behind the seat via a moving unit so as to be moved anteroposteriorly and to partition the indoor space in the vehicle into a front passenger space and a rear baggage-loading space, a hinge bracket configured to hingedly couple a seat cushion of the seat to the vehicle floor, a caster mounted to the seat so as to enable the seat to be rolled along the vehicle floor and the partition wall, and a holding unit configured to selectively hold the seat cushion of the seat to the vehicle floor or the partition wall.

9 Claims, 4 Drawing Sheets

(56) References Cited

U.S. PATENT DOCUMENTS 8,328,266 B2 * 12/2012 Yasui ................... B60N 2/305
  296/183.1
2011/0156429 A1 * 6/2011 Shimizu ............... B60N 2/3011
  296/26.09

FOREIGN PATENT DOCUMENTS

| DE | 60113345 T2 | 6/2006 |
| JP | 2002-087125 A | 3/2002 |
| KR | 1020050029908 A | 3/2005 |
| KR | 1020070064466 A | 6/2007 |

\* cited by examiner

VEHICULAR SEAT APPARATUS

CROSS-REFERENCE TO RELATED APPLICATION

This application claims under 35 U.S.C. § 119(a) the benefit of priority to Korean Patent Application No. 10-2020-0088611 filed on Jul. 17, 2020, the entire contents of which are incorporated herein by reference.

BACKGROUND

(a) Technical Field

The present disclosure relates to a vehicular seat apparatus. More particularly, it relates to a vehicular seat apparatus capable of increasing the baggage-loading space in a vehicle.

(b) Background Art

A vehicle is provided therein with seats. Each of the seats of a vehicle is composed of a seat cushion configured to support the lower body of a passenger and a seat back configured to support the upper body of the passenger. Furthermore, a typical vehicular seat is provided at the upper end of the seat back thereof with a headrest configured to support the head and the neck of the user.

In addition, the vehicular seat is provided with an armrest on which a user arm rests, a cup holder configured to hold a beverage container such as a can, a bottle, a cup or the like, a recliner configured to adjust a slope angle of the seat back in an anteroposterior direction, a position adjuster configured to adjust the position of the seat in the anteroposterior direction and the like.

With the recent diversified uses of vehicles, demand for a vehicle structure capable of allowing the interior structure of the vehicle to be changed depending on the situation is increased.

Particularly, a typical vehicle may further require additional space for loading therein a large amount of baggage, which is necessary for outdoor activities such as camping, picnics or the like, in addition in the basic luggage compartment.

To this end, a structure in which, when a seat back 3 of a rear seat 2 is folded, the space above the seat back 3 of the folded rear seat 2 is capable of being used as a baggage-loading space is used, as illustrated in FIG. 1.

In the structure shown in FIG. 1, the seat back 3 of the rear seat 2 is configured to be folded forwards, and the lower portion of the seat cushion 4 is fixed to a vehicle floor 1.

As illustrated in the drawing, by configuring the rear seat 2 to be foldable and to be fixedly coupled to the vehicle floor 1, it is possible to provide a space for accommodating therein baggage behind the rear seat 2.

Furthermore, when there is insufficient baggage-loading space in such a vehicle, the seat back 3 may be folded and baggage may be loaded on top of the folded seat back, in order to secure additional baggage-loading space.

However, when baggage is loaded on the folded seat back 3 in the conventional folding seat, the weight of the baggage imposes a load on the seat, as illustrated in FIG. 2. Here, when the loading of baggage is frequently repeated or the baggage is heavy, the seat may be deformed or damaged.

Particularly, when heavy baggage is repeatedly loaded, the cushioning properties and elasticity of the seat back 3 and the seat cushion 4 may gradually deteriorated. In this case, because the shapes of the seat back 3 and the seat cushion 4 may be changed, the ride quality experienced by a passenger may vary.

Furthermore, when the seat is pressed by the baggage, the imprint of a buckle or a similar imprint may be formed on the pad of the seat back, the pad of the seat cushion, or a side bolster, and the shape of the pad may be deformed.

In addition, leather or the like, which is the skin material of the seat, may be deformed in appearance, or may be damaged.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art in which the weight of baggage is applied to a seat when the baggage is loaded on the seat. An object of the present invention is to provide a vehicular seat apparatus capable of securing expanded loading space in a vehicle in which baggage is loaded and of preventing the weight of the loaded baggage from being applied to a seat.

In one aspect, the present invention provides a vehicular seat apparatus including a seat configured to enable a seat back thereof to be folded, a partition wall, which is disposed vertically on a vehicle floor behind the seat and is coupled to the vehicle floor via a moving unit so as to be moved anteroposteriorly and to partition the indoor space in the vehicle into a front passenger space, in which the seat is provided, and a rear baggage-loading space, a hinge bracket configured to hingedly couple a seat cushion of the seat to the vehicle floor, a caster mounted to the seat so as to enable the seat to be rolled along the vehicle floor and the partition wall, and a holding unit configured to selectively hold the seat cushion of the seat to the vehicle floor or the partition wall.

In a preferred embodiment, the partition wall may be provided on the front surface of the lower end thereof with a guide portion projecting therefrom so as to guide the movement of the caster between an upper surface of the vehicular floor and a front surface of the partition wall.

In another preferred embodiment, the caster may be rolled along an upper surface of the guide portion.

In still another preferred embodiment, the caster may include a pair of casters, which are disposed at right and left sides of the lower surface of the seat cushion, and the guide portion may include a pair of guide portions, which are provided on the front surface of the lower end of the partition wall so as to allow the pair of casters to be respectively rolled on the pair of guide portions.

In yet another preferred embodiment, the partition wall may be a plate-shaped wall, which is disposed so as to extend in a transverse direction across the indoor space in the vehicle, and the pair of guide portions may be configured such that each thereof has a plate shape and extends in an anteroposterior direction of the vehicle.

The hinge bracket may be configured to hingedly couple a front end of the seat cushion to the vehicle floor, and the guide portion may have an upper surface having a curved surface, a height of which gradually increases moving backwards such that the curved surface has a shape corresponding to an orbit along which the caster is moved while the seat, the seat back of which is folded, is rotated about the hinge bracket, whereby a rear end of the seat cushion is pushed and erected upwards.

The moving unit may be a rail unit, the rail unit including a pair of lower rails, which are mounted on the vehicle floor and extend in the anteroposterior direction of the vehicle so as to be parallel to each other, and a pair of upper rails, which are mounted on the guide portion of the partition wall in an anteroposterior direction and are respectively and slidably coupled to the pair of lower rails.

The partition wall may include a holding unit configured to hold the upper rails, which are slidably moved along the lower rails, at a predetermined location on the lower rails to thus hold the location of the partition wall in an anteroposterior direction.

In still yet another preferred embodiment, the holding unit may a latch unit, the latch unit including a manipulator configured to be manipulated by a user so as to allow the user to perform locking or unlocking, a claw mounted to the seat cushion so as to be rotated in linkage with manipulation of the manipulator, and strikers, which are respectively mounted at a predetermined location on the vehicle floor and a predetermined location on the partition wall and one of which is fitted into and coupled to a fitting groove in the claw and is disengaged from the claw.

In a further preferred embodiment, the hinge bracket may be configured to hingedly couple a front end of the seat cushion to the vehicle floor, and the caster is a pair of casters, which are respectively disposed at right and left sides of a lower surface of a rear end of the seat cushion.

Other aspects and preferred embodiments of the invention are discussed infra.

It is to be understood that the term "vehicle" or "vehicular" or other similar terms used herein are inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative-fuel vehicles (e.g. fuels derived from resources other than petroleum). As referred to herein, a hybrid vehicle is a vehicle that has two or more sources of power, for example a vehicle powered by both gasoline and electricity.

The above and other features of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

Figure 1:
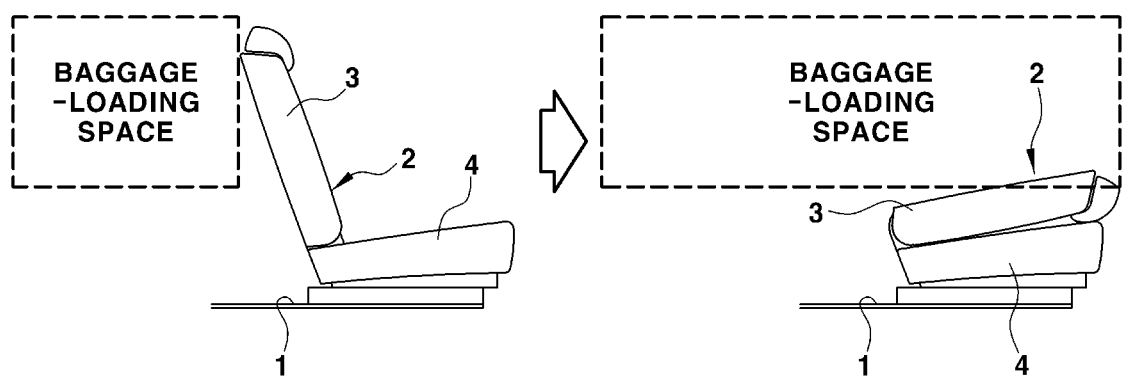
FIG. 1 is a view illustrating the operation of a conventional vehicular seat in which a seat back is folded to load baggage thereon.
Figure 2:
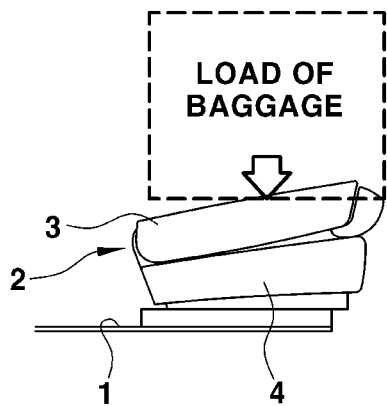
FIG. 2 is a view illustrating a problem with the conventional vehicular seat.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, the reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Hereinafter, preferred embodiments of the present invention will be described with reference to the attached drawings so as to enable the embodiments to be easily understood by one of ordinary skill in the art to which this invention belongs. However, the present invention is not limited to the embodiments disclosed hereinafter, but may be embodied in different modes.

When a part is described as "comprising" a component throughout the specification, unless otherwise defined, the part should be understood so as not to exclude the presence of another component but to further include another component.

The present invention relates to a vehicular seat apparatus, which is constructed such that a seat back is capable of being folded.

Specifically, the vehicular seat apparatus according to the embodiment of the present invention may be applied to a rear seat of a vehicle, which is capable of using the space in the vehicle behind the rear seat back as a baggage-loading space.

The vehicular seat apparatus according to the embodiment of the present invention is useful for vehicles, each of which is partitioned into a passenger space and a baggage-loading space, for example, trucks or high-occupancy vehicles such as vans and SUVs, each of which is provided with a rear seat capable of enabling the seat back thereof to be folded.

Figure 3:
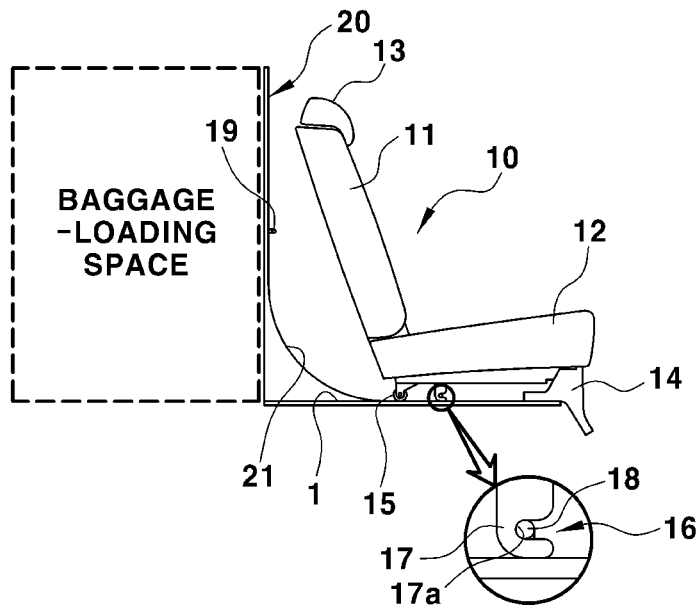
FIG. 3 is a side view of a vehicular seat apparatus according to an embodiment of the present invention.
Figure 4:
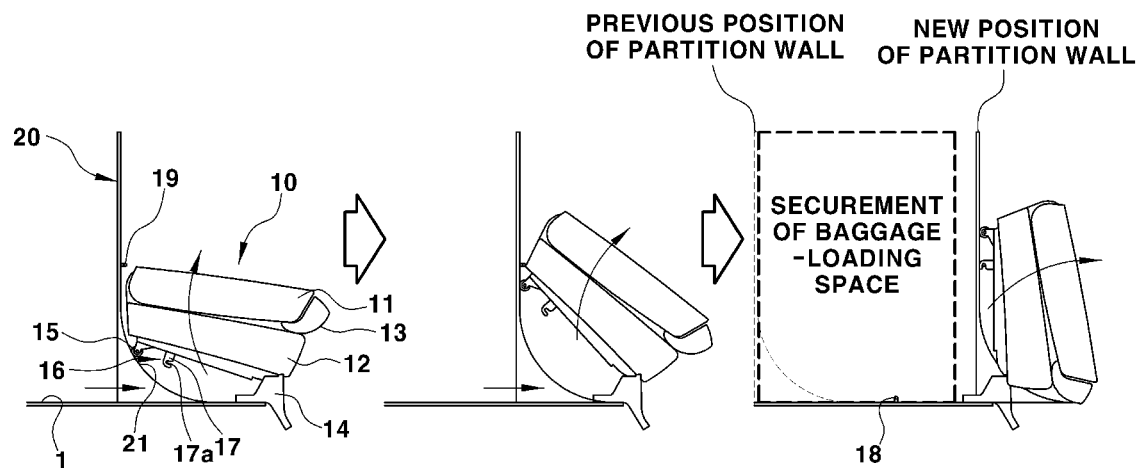
FIG. 4 is a view illustrating an operation of a seat of the vehicular seat according the embodiment of the present invention to secure a baggage-loading space.

FIG. 3 is a side view of the vehicular seat apparatus according to an embodiment of the present invention. FIG. 4 is a view illustrating operation of a seat of the vehicular seat apparatus according to the embodiment of the present invention to secure baggage-loading space.

Figure 5:
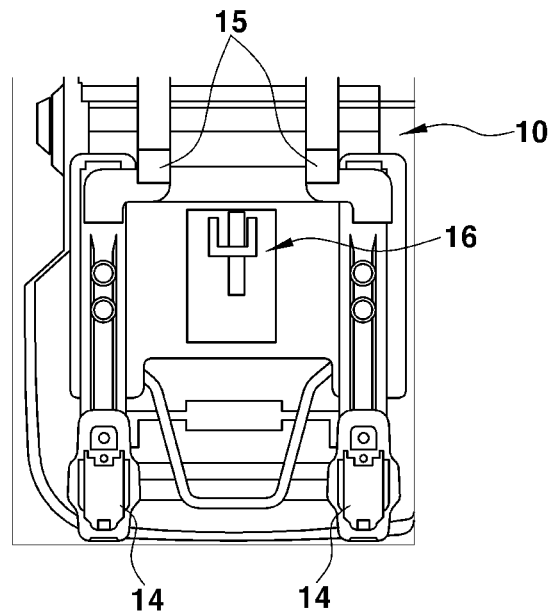
FIG. 5 is a view illustrating the structure of the lower surface of the seat of the vehicular seat apparatus according to the embodiment of the present invention.

FIG. 5 is a view illustrating the structure of the lower surface of the seat of the vehicular seat apparatus according to the embodiment of the present invention.

In order to overcome the problems with the conventional seat structure in which the load of baggage is applied to the seat when the baggage is loaded on the seat, the present invention is intended to provide a vehicular seat apparatus configured not only to secure increased loading space in the interior of a vehicle in which baggage is loaded but also to prevent the load of the baggage from being applied to the seat.

To this end, the vehicular seat apparatus according to the embodiment of the present invention is mainly characterized in that, after the seat 10 has been folded and erected, a portion of the space that was occupied by the seat is secured as a baggage-loading space, rather than securing a baggage-loading space above the folded seat.

The phrase "the seat 10 is folded" means that the seat back 11 is rotated forwards so as to be folded on the seat cushion 12, and the phrase "the seat 10 is erected" means that the rear portion of the seat 10, on which the seat back 11 is folded, is lifted, and thus the seat 10 is erected (see the right side of FIG. 4).

The construction of the embodiment of the present invention will now be described in detail. As illustrated in FIG. 3, the vehicular seat apparatus according to the embodiment of the present invention includes the seat 10, the seat back 11 of which is foldable, and a partition wall 20, which is mounted on a vehicle floor 1 behind the seat 10 in the upright state so as to slide anteroposteriorly and to isolate the front passenger space from the rear baggage-loading space.

Furthermore, the vehicular seat apparatus according to the embodiment of the present invention may further include a hinge bracket 14, configured to hingedly couple the front end of the seat cushion 12 to the vehicle floor 1, and a holding unit 16, configured to selectively lock the seat cushion 12 to the vehicle floor 1 or the partition wall 20.

FIG. 3 illustrates the state of the seat in a passenger-boarding mode, that is, the state of the seat that enables a passenger to enter the vehicle and sit on the seat. As illustrated in the drawing, the seat 10 may include the seat back 11, configured to support the upper body of a passenger, the seat cushion 12, configured to support the lower body of the passenger, and a headrest 13, configured to support the head and neck portions of the passenger.

Here, the seat cushion 12 is lockably coupled to the vehicle floor 1, and the seat back 11 is foldable forwards toward the seat cushion 12.

In the vehicular seat apparatus according to the embodiment of the present invention, the structure configured to fold the seat back 11 does not differ from that of a known conventional vehicular seat. Since the structure configured to fold the seat back is a known technology that is already known to those skilled in the art, a description thereof is omitted.

In the vehicular seat apparatus according to the embodiment of the present invention, the hinge bracket 14 is a component that rotatably couples the front end of the seat cushion 12 to the vehicle floor 1 and supports the front end of the seat cushion 12 with respect to the vehicle floor 1 in the state of being coupled both to the front end of the seat cushion 12 and to the vehicle floor 1.

Although not specifically illustrated in the drawings, the hinge bracket 14 may include a fixing element fixed to the vehicle floor 1, and a rotating element, which is fixedly mounted to the front end of the seat cushion 12 and is hingedly coupled to the fixing element.

In the embodiment of the present invention, the hinge bracket 14 may have any construction or configuration without particular limitation, as long as the hinge bracket 14 is capable of coupling the front end of the seat cushion 12 to the vehicle floor 1 such that the front end of the seat cushion 12 is rotatable about the hinge axis (or the hinge point) and of supporting the front end of the seat cushion.

In the embodiment of the present invention, the hinge bracket 14 may be composed of a pair of hinge brackets, which are mounted on the right and left sides of the lower surface of the front end of the seat cushion 12, as illustrated in FIG. 5.

A caster 15 may be mounted on the lower surface of the rear end of the seat cushion 12 so as to support the seat 10 with respect to the vehicle floor 1 in conjunction with the hinge bracket 14.

Consequently, the seat cushion 12 may be supported by the vehicle floor 1 by means of the hinge bracket 14 at the front end of the seat cushion 12 and the caster 15 at the rear end of the seat cushion 12. The hinge bracket 14 serves to rotatably support the front end of the seat cushion 12 while maintaining the position of the seat cushion 12 in an anteroposterior direction, and the caster serves to allow the rear end of the seat cushion 12 to slide along the vehicle floor 1 or the partition wall 20 to be described later while supporting the rear end of the seat cushion 12 with respect to the vehicle floor 1.

In the embodiment of the present invention, the caster 15 may be composed of a pair of casters, which are mounted to the right and left sides of the lower surface of the rear end of the seat cushion 12, as illustrated in FIG. 5.

The holding unit 16 is intended to lock the seat cushion 12 to the vehicle floor 1 or the partition wall 20, and may be embodied as a latch device in which a claw 17 is engaged with a striker 18 or 19 mounted at a predetermined location on the vehicle floor 1 or the partition wall 20 and is thus locked thereto.

The latch unit 16 may include, in addition to a manipulator (not shown), which is manipulated so as to perform locking and unlocking, the claw 17, which is mounted to the seat cushion 12 so as to be rotated in linkage with manipulation of the manipulator, and the strikers 18 and 19, which are respectively mounted to the vehicle floor 1 and the partition wall 20 and are fitted into and coupled to a fitting groove 17a in the claw 17 so as to hold the claw 17.

Here, the locked state of the latch unit 16 is a coupled and held state in which the striker 18 or 19 is fitted into the fitting groove 17a in the claw 17 such that the striker 18 or 19 cannot be separated from the claw 17.

Meanwhile, the unlocked state of the latch unit 16 is an uncoupled state in which the striker 18 or 19 is capable of being taken out of the fitting groove 17a in the claw 17 and the claw 17 is capable of being separated from the striker 18 or 19.

In addition to the above-mentioned components, the latch unit 16 may further include a pawl (not shown) configured to be rotated in linkage with rotation of the claw 17, an elastic member (not shown) configured to elastically rotate the claw 17 or the pawl, and the like.

In the embodiment of the present invention, because the functions of the latch unit 16, which is configured to hold the seat 10 by virtue of coupling of the claw 17 with the striker 18 or 19, including the function of holding the seat cushion 12 to the vehicle floor 1, are well known to those skilled in the art, a further description thereof is omitted.

In the embodiment of the present invention, the holding unit 16 may be embodied as any of various coupling units in addition to the above-mentioned latch unit, as long as the unit is capable of selectively coupling and holding the seat 10 to the vehicle floor 1 or the partition wall 20.

Figure 6:
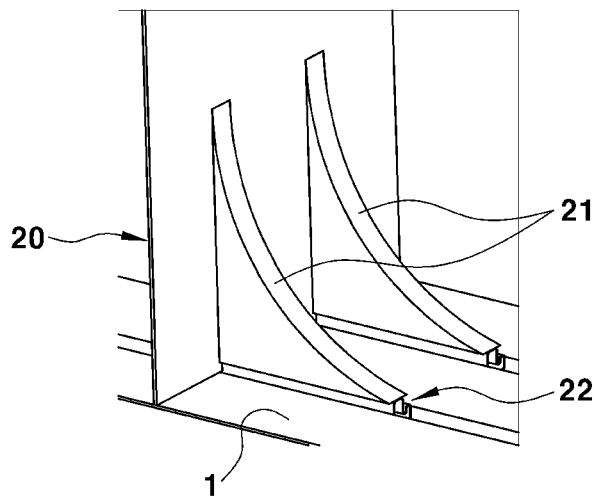
FIG. 6 is a perspective view illustrating a lower structure of a partition wall to which the seat of the vehicular seat apparatus according to the present invention, which has been folded and erected, is coupled.
Figure 7:
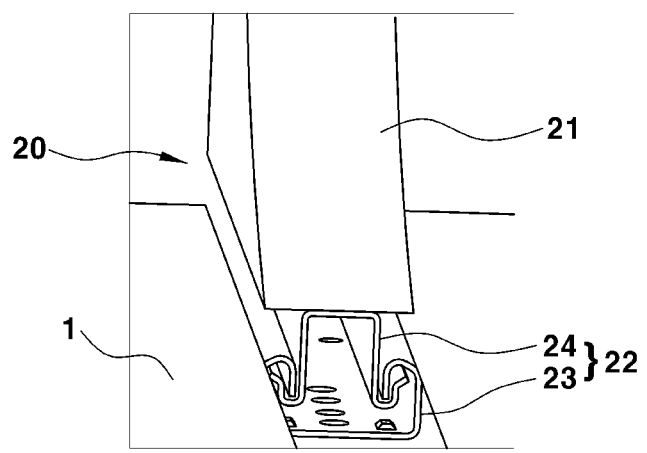
FIG. 7 is a perspective view illustrating the structure of a rail of the vehicular seat apparatus according to the embodiment of the present invention for sliding movement of the partition wall.

FIG. 6 is a perspective view illustrating the lower structure of the partition wall 20 to which the seat of the vehicular seat apparatus according to the embodiment of the present invention, which is in the folded and erected state, is coupled. FIG. 7 is a perspective view illustrating the construction of a rail of the vehicular seat apparatus according to the embodiment of the present invention, which allows the partition wall to slide.

The partition wall 20, which serves to partition the indoor space in the vehicle into a passenger space, in which the seat 10 is provided, and a baggage-loading space behind the passenger space, may be vertically mounted on the vehicle floor 1.

The partition wall 20 may be made of a plate having a predetermined thickness, and the lower end of the partition wall 20 may be coupled to the vehicle floor 1 via a moving unit 22.

In the embodiment of the present invention, the partition wall 20 may be embodied as a plate member, which is vertically erected in the indoor space in the vehicle in a transverse direction of the vehicle, perpendicular to the longitudinal direction of the vehicle.

Here, the partition wall 20 may be disposed so as to extend in a transverse direction across the indoor space in the vehicle, whereby the indoor space in the vehicle is partitioned into a front space and a rear space by means of the partition wall 20.

The lower end of the partition wall 20 may be integrally provided with a pair of guide portions 21 so as to allow the pair of casters 15 of the seat to move along the upper surface of the pair of guide portions 21, and the pair of guide portions 21 may be configured so as to project forwards from the front surface of the lower end of the partition wall 20.

As illustrated in FIG. 6, the pair of guide portions 21 may be mounted on the front surface of the lower end of the partition wall 20 so as to be parallel to each other, and each of the pair of guide portions 21 may be embodied as a plate, which is disposed so as to be perpendicular to the partition wall 20, that is, so as to extend in the longitudinal direction of the vehicle.

When the partition wall 20 is slid forwards on the vehicle floor 1 in the state in which the seat back 11 of the seat 10 is folded, the casters 15 of the rear end of the seat cushion 12 are rolled along the upper surfaces of the pair of guide portions 21.

To this end, the upper surface of each of the pair of guide portions 21 may be configured to have a shape corresponding to the orbit along which a corresponding one of the casters 15 of the rear end of the seat cushion 12 travels while the seat 10 is rotated and erected about the hinge brackets 14.

In other words, the upper surface of each of the pair of guide portions 21 may be configured to have an arc-like curved surface, particularly an inclined curved surface, the height of which increases moving backwards.

The pair of guide portions 21 serves to guide the casters, which are moved on the upper surface of the vehicle floor 1 in a rolling manner, to the front surface of the partition wall 20 when the seat 10 is folded and then erected. The casters 15 are moved to the front surface of the partition wall 20 while rolling along the guide portions 21 on the upper surface of the vehicle floor 1.

Meanwhile, when the erected seat 10 is rotated in the reverse direction about the hinge brackets 14, the casters 15 of the seat 10 are rolled along the upper surfaces of the guide portions 21 on the front surface of the partition wall 20 and are then moved to the upper surface of the vehicle floor 1. Subsequently, the casters 15 of the seat 10 are moved forwards along the upper surface of the vehicle floor 1.

The lower end of the partition wall 20 is coupled to the vehicle floor 1 so as to slide anteroposteriorly. In other words, the lower surfaces of the pair of guide portions 21 are coupled to the vehicle floor 1 via the moving unit 22 so as to slide anteroposteriorly.

In the embodiment of the present invention, the moving unit 22 may be a rail unit, which is coupled to the vehicle floor 1 so as to slide anteroposteriorly. The rail unit may be composed of a lower rail 23 mounted on the vehicle floor 1 and an upper rail 24 mounted on the partition wall 20.

In the moving unit (22), that is, the rail unit, the upper rail 24 is slidably coupled to the lower rail 23.

The upper rail 24 may be composed of a pair of rails, which are mounted to the pair of parallel guide portions 21 of the partition wall 20 and extend in the anteroposterior direction of the vehicle.

Similarly, the lower rail 23 may be composed of a pair of rails, which are disposed at the right and left sides of the vehicle floor 1 and extend in the anteroposterior direction of the vehicle so as to be parallel to each other.

Accordingly, when the upper rail 24 slides along the lower rail 23 in the state in which the upper rail 24 of the partition wall 20 is coupled to the lower rail 23 of the vehicle floor 1, the partition wall 20 is moved in the anteroposterior direction of the vehicle.

The rail unit, which is composed of the combination of the upper rail and the lower rail, may also be applied to a seat rail, which enables a seat to slide anteroposteriorly on a vehicle floor of a general vehicle. The rail unit, which is composed of the upper rail 24 and the lower rail 23 coupled to the upper rail 24, may be applied to the embodiment of the present invention for anteroposterior movement of the partition wall 20.

As a result, the partition wall 20 may slide anteroposteriorly along the lower rail 23 of the vehicle floor 1 in the vehicle interior. Like a holding unit configured to hold a seat, which has been slid along seat rails anteroposteriorly, the holding unit may also be configured to hold the partition wall 20, which has slid along the rail unit 22 anteroposteriorly.

In the embodiment of the present invention, the rail unit 22 for sliding movement of the partition wall 20 may be embodied as a slide unit, which is operated by the same operational principle as a seat rail, which enables the seat 10 to slide along the vehicle floor 1 anteroposteriorly and to hold the seat at a given location.

Furthermore, as in the case in which a seat is slidably moved on a vehicle floor via seat rails and is then held in place in the anteroposterior direction by virtue of locking between an upper rail and a lower rail, the partition wall 20 may be slidably moved on the vehicle floor 1 anteroposteriorly and may then be held in place in the anteroposterior direction by virtue of locking between the upper rail 24 and the lower rail 23.

Since the construction of the conventional holding unit configured to hold a seat at a location in the anteroposterior location is already well known to those skilled in the art, a detailed illustration and description of the holding unit according to the embodiment of the present invention are omitted.

For example, in the case in which locking holes are formed in the lower rail 23, mounted on the vehicle floor 1, at predetermined intervals in the longitudinal direction, in which the location in the anteroposterior direction of the upper rail 24 is adjustable, and in which the holding unit configured to lock the upper rail 24 to a selected one of the locking holes is provided, it is possible for a user to arbitrarily adjust the location of the partition wall 20 on the vehicle floor 1 in the anteroposterior direction.

Of course, the partition wall 20 may also be held at any of only two locations, that is, the foremost location and the rearmost location, by means of the holding unit, rather than being arbitrarily held at any of a plurality of locations set at regular intervals.

Heretofore, the construction of the vehicular seat apparatus according to the embodiment of the present invention has been described.

The operation of the vehicular seat apparatus according to the embodiment of the present invention will now be described with reference to FIG. 4.

First, the seat back 11 is folded forwards so as to overlap the seat cushion 12, and the locking of the holding unit, that is, the latch unit 16, is released so as to allow the seat cushion 12 to be lifted from the vehicle floor 1.

The space behind the partition wall 20 serves as a baggage-loading space. In order to expand the baggage-loading space after the seat back 11 is folded and the locked state of the latch unit 16 is released, the partition wall 20 is moved forwards.

Specifically, after the locked state of the latch unit 16 is released so as to allow the partition wall 20 to slide anteroposteriorly along the lower rails 23 of the vehicle floor 1, the partition wall 20 is pushed and moved forwards. At this time, the casters 15 of the folded seat 10 are moved along the upper surfaces of the guide portions 21 of the partition wall 20.

When the partition wall 20 is moved forwards such that the casters 15 of the folded seat 10 are moved along the upper surfaces of the guide portions 21 of the partition wall 20, the rear end of the folded seat 10 is pushed upwards. At this time, the seat 10 is rotated about the hinge brackets 14 at the front end of the seat cushion 12.

Subsequently, when the partition wall 20 is moved further forwards, the casters 15 of the seat 10 are moved to the front surface of the partition wall 20 along guide portions 21. When the casters 15 of the seat 10 are moved upwards along the front surface of the partition wall 20, the seat 10 is further erected.

In other words, the folded seat 10 is rotated about the hinge brackets 14 and is positioned in the erected state in which the rear end of the seat cushion 12 is positioned at the uppermost level and the front end of the seat cushion 12 is positioned at the lowermost level.

Subsequently, when the partition wall 20 is moved further forwards to the foremost location at which the partition wall 20 cannot be moved forwards any further, the position of the partition wall 20 is held by locking of the holding unit. Subsequently, the claws 17 of the latch unit 16 mounted to the lower portion of the seat 10 are engaged with the strikers 19 of the partition wall 20 and are locked thereto, thereby holding the seat 10 to the partition wall 20 in the erected state.

As a result, when the partition wall 20 is moved forwards and the folded seat 10 is erected and held to the partition wall 20, an expanded baggage-loading space is secured behind the partition wall 20.

As is apparent from the above description, according to the embodiment of the present invention, since the partition wall configured to isolate the passenger space from the baggage-loading space is provided, and the seat, which has been folded and erected, is held to the partition wall, which has been moved forwards, it is possible to expand the baggage-loading space behind the seat and the partition wall when necessary. As a result, since there is no need to load baggage on the folded seat, as in a conventional vehicular seat, it is possible to efficiently prevent deformation and damage to the seat.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A vehicular seat apparatus comprising:
 a seat configured to enable a seat back thereof to be folded;
 a partition wall, which is disposed vertically on a vehicle floor behind the seat and is coupled to the vehicle floor via a moving unit so as to be moved anteroposteriorly and to partition an indoor space in a vehicle into a front passenger space, in which the seat is provided, and a rear baggage-loading space;
 a hinge bracket configured to hingedly couple a seat cushion of the seat to the vehicle floor;
 a caster mounted to the seat so as to enable the seat to be rolled along the vehicle floor and the partition wall; and
 a holding unit configured to selectively hold the seat cushion of the seat to the vehicle floor or the partition wall,
 wherein the moving unit is a rail unit, the rail unit including:
 a pair of lower rails, which are mounted on the vehicle floor and extend in an anteroposterior direction of the vehicle so as to be parallel to each other; and
 a pair of upper rails, which are mounted on guide portion of the partition wall in an anteroposterior direction and are respectively and slidably coupled to the pair of lower rails.

2. The vehicular seat apparatus of claim 1, wherein the partition wall is provided on a front surface of a lower end thereof with a guide portion projecting therefrom so as to guide movement of the caster between an upper surface of the vehicular floor and a front surface of the partition wall.

3. The vehicular seat apparatus of claim 2, wherein the caster is rolled along an upper surface of the guide portion.

4. The vehicular seat apparatus of claim 3, wherein the caster includes a pair of casters, which are disposed at right and left sides of a lower surface of the seat cushion, and the guide portion includes a pair of guide portions, which are provided on the front surface of the lower end of the partition wall so as to allow the pair of casters to be respectively rolled on the pair of guide portions.

5. The vehicular seat apparatus of claim 4, wherein the partition wall is a plate-shaped wall, which is disposed so as to extend in a transverse direction across the indoor space in the vehicle, and each of the pair of guide portions is configured to have a plate shape and to extend in an anteroposterior direction of the vehicle.

6. The vehicular seat apparatus of claim 3, wherein the hinge bracket is configured to hingedly couple a front end of the seat cushion to the vehicle floor, and wherein the guide portion has an upper surface having a curved surface, a height of which gradually increases moving backwards such that the curved surface has a shape corresponding to an orbit along which the caster is moved while the seat, in which the seat back is folded, is rotated about the hinge bracket, whereby a rear end of the seat cushion is pushed and erected upwards.

7. The vehicular seat apparatus of claim 1, wherein the partition wall includes a holding unit configured to hold the upper rails, which are slidably moved along the lower rails, at a predetermined location on the lower rails to thus hold a location of the partition wall in an anteroposterior direction.

8. The vehicular seat apparatus of claim 1, wherein the holding unit is a latch unit, the latch unit including:
- a manipulator, configured to be manipulated by a user so as to allow the user to perform locking or unlocking;
- a claw mounted to the seat cushion so as to be rotated in linkage with manipulation of the manipulator; and
- strikers, which are respectively mounted at a predetermined location on the vehicle floor and a predetermined location on the partition wall and one of which is fitted into and coupled to a fitting groove in the claw and is disengaged from the claw.

9. The vehicular seat apparatus of claim 1, wherein the hinge bracket is configured to hingedly couple a front end of the seat cushion to the vehicle floor, and the caster includes a pair of casters, which are respectively disposed at right and left sides of a lower surface of a rear end of the seat cushion.

\* \* \* \* \*